March 8, 1927.
H. PAPST
1,620,608
ELECTRIC MACHINE WITH SPLIT POLES
Filed May 25, 1926
Fig. 1.
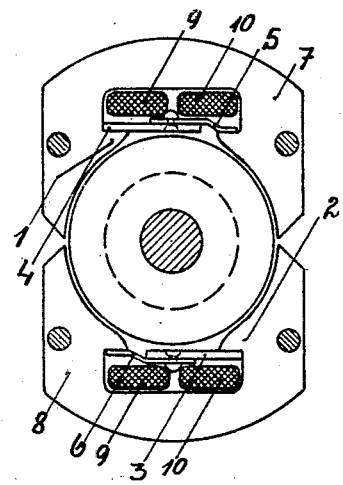
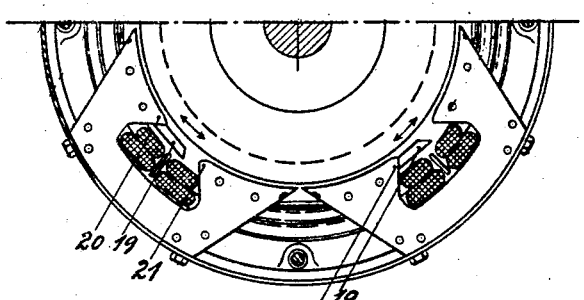
Fig. 2.
Inventor
Hermann Papst
by Ernest D. Jansen
Atty.

Patented Mar. 8, 1927.

1,620,608

UNITED STATES PATENT OFFICE.

HERMANN PAPST, OF VIENNA, AUSTRIA, ASSIGNOR TO EDWARD D. FELDMAN, OF NEW YORK, N. Y.

ELECTRIC MACHINE WITH SPLIT POLES.

Application filed May 25, 1926, Serial No. 111,586, and in Austria March 11, 1925.

My invention relates to improvements in electric machines with split poles and more particularly to the arrangement of commutation poles in such machines. The invention is based upon the fact that in a split pole machine the location of the neutral zone is less determined by the position of the pole clearance than by the position of the pole gaps. By neutral zone is in this case to be understood that position of the brushes in which the armature does not influence the main field by counter ampere turns. This neutral zone is in split pole machines situated fairly accurately at the geometric mid-point between adjacent pole gaps.

My invention consists essentially in the provision of means for changing the location of the pole clearance of a split pole motor to an unsymmetrical position with respect to the centers of the pole gaps, whereby the effect of the armature counter-ampere turns may be greatly diminished in the brush zone and the brushes operated in a favorable commutation field.

Another feature of my invention is that the commutation tooth is detachably mounted at one pole edge and may be turned upon or linearly displaced along its pole edge.

A further feature of my invention is that the commutation tooth may be swung from one pole edge on to the opposite one so that it may be employed for reversible machines.

In the accompanying drawings which illustrate one embodiment of my invention—

Fig. 1 is an end view of the magnet frame of a small two pole split pole machine embodying one form of my invention for changing the location of the pole clearance.

Fig. 2 is an end view of a half section of a large split pole machine illustrating the application of my invention to reversible machines.

In Fig. 1 a symmetrical split pole frame is illustrated provided on each pole edge 1 and 2 with a piece of iron 3 and 4. In the case of motors the pieces 3 and 4 are mounted to point in the direction of rotation and serve as commutation teeth. The iron pieces 3 and 4 are mounted upon the pole pieces 7 and 8 by means of brass pieces 5 and 6 which also support the field coils 9 and 10. The illustrated arrangement of employing separate pieces 3 and 4 is advantageous because of the possibility of inserting finished coils. The arrangement operates correctly in one direction of rotation only but this is immaterial in most cases. The other direction of rotation can be attained by changing the connections and placing the commutation teeth on the other pole edges after opening the machine. Both shaft ends may also be carried through and by changing the machine the other direction of rotation may be used. The arrangement described is in small machines suitable for series as well as shunt windings. In the case of shunt windings the commutation field is to be chosen in correspondence with a mean load, so that in the case of no-load and full load run no excessively large faulty field exists.

In order to enable the commutation tooth arrangement to be employed also for reversible machines rotatable commutation teeth may be employed, which can during service be turned from one pole edge on to the other, as shown in Fig. 2. The commutation teeth 19 are adapted to be swung around between the two pole edges 20 and 21 and are according to the direction of rotation put upon one or the other pole edge, for which purpose they may for instance be attached to a supporting structure similar to a brush bridge, not illustrated. The brushes themselves remain in their positions.

The displaceable pieces 19 in the pole clearance could be avoided by changing the position of the pole gap by means of a slidable piece of iron so arranged that the pole gap is positioned to the left or the right of the piece of iron. It is then, however, necessary to displace the brushes also so that this arrangement, not illustrated in the drawing, becomes somewhat complicated.

I claim:

1. In a split pole dynamo electric machine having brushes interposed midway between the pole gaps, means interposed between said poles for shifting the pole clearance to an unsymmetrical position with respect to said pole gaps, whereby the path of the cross magnetizing field of the motor armature during load is shifted to produce a substantially neutral zone in the region of said brushes, said means comprising a single member adapted to be detachably connected to either of the opposite edges of two adjacent poles to shift the position of said pole clearance.

2. In a reversible split pole dynamo electric machine having brushes interposed midway between the pole gaps, means interposed between said poles for shifting the pole clearance to an unsymmetrical position with respect to said pole gaps, whereby the path of the cross magnetizing field of the motor armature during load is shifted to produce a substantially neutral zone in the region of said brushes, said means comprising a single member adapted to be moved into and out of engagement with the opposite edges of two adjacent poles to partially extend across said pole clearance to shift the position thereof with respect to said pole gaps, whereby the path of said cross magnetizing field may be shifted to either side of the position of said brushes.

3. In a split pole dynamo electric machine having brushes located in the pole clearance, a member disposed adjacent to said brushes and extending partially across said pole clearance to shift the location thereof to an unsymmetrical position with respect to the pole gaps between said split poles, whereby the path of the cross magnetizing field of the motor armature during load is shifted to one side of said brushes to produce a substantially neutral zone in the region of said brushes, said member being adapted to be detachably connected to either of the opposite edges of two adjacent poles to form part of the magnetic circuit thereof, and to partially extend across said pole clearance therefrom.

In testimony whereof I affix my signature.

HERMANN PAPST.